United States Patent
Thandiwe

(10) Patent No.: US 6,246,600 B1
(45) Date of Patent: Jun. 12, 2001

(54) MULTI-USE BATTERY

(75) Inventor: Iilonga Pendapala Thandiwe, Atlanta, GA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/627,875

(22) Filed: Jul. 28, 2000

(51) Int. Cl.[7] .................................................. H02M 1/00
(52) U.S. Cl. ............................................................ 363/144
(58) Field of Search ................................... 363/144, 146, 363/147; 320/103, 114, 116, 119

(56) References Cited

U.S. PATENT DOCUMENTS

| | | | | |
|---|---|---|---|---|
| 5,734,254 | * | 3/1998 | Stephens | 320/106 |
| 6,075,343 | * | 6/2000 | Hsu | 320/134 |
| 6,160,378 | * | 12/2000 | Helot et al. | 320/119 |

* cited by examiner

*Primary Examiner*—Matthew Nguyen
(74) *Attorney, Agent, or Firm*—Philip H. Burrus, IV

(57) ABSTRACT

An adapter for interfacing a battery for a portable computer to an electronic device of a type that is not normally compatible with the battery for the portable computer includes a power adapter, a device-specific module and a delivery circuit. The power adapter is removably couplable to a portable computer battery and includes a power conversion circuit that converts a first electrical voltage received from the battery to a second electrical voltage. The device-specific module is removably couplable to the power adapter. The device-specific module receives the second electrical voltage from the power adapter and converts the second electrical voltage to a device-specific electrical voltage. The delivery circuit couples the device-specific module to the electronic device, thereby allowing delivery of the device-specific electrical voltage to the electronic device.

6 Claims, 1 Drawing Sheet

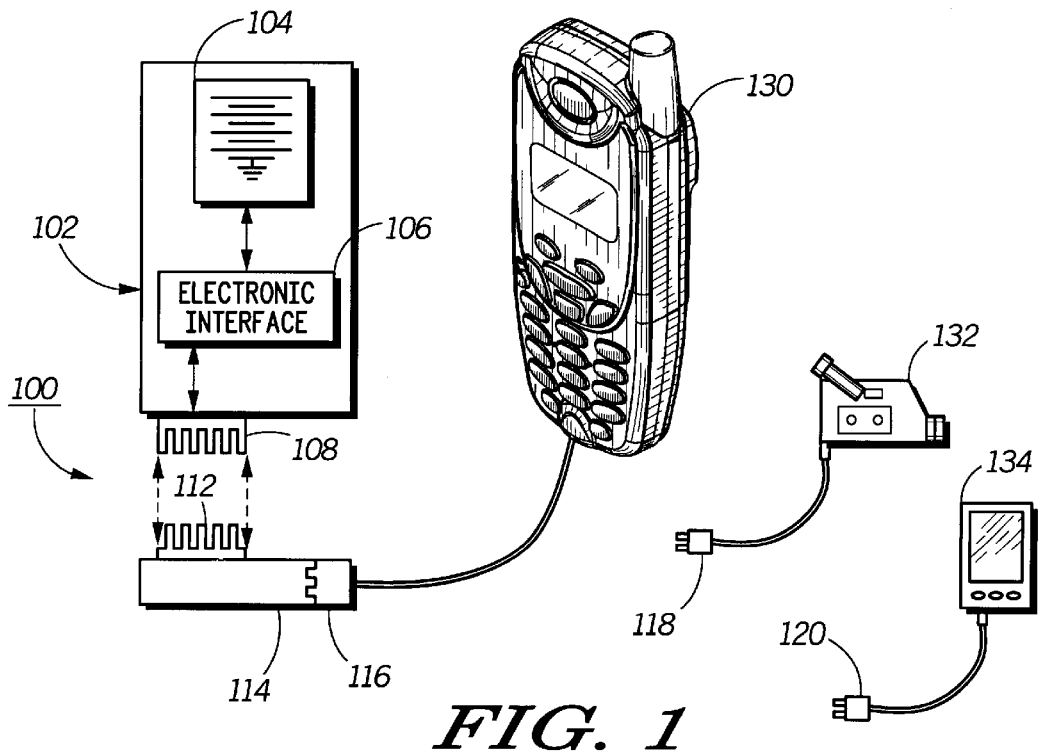
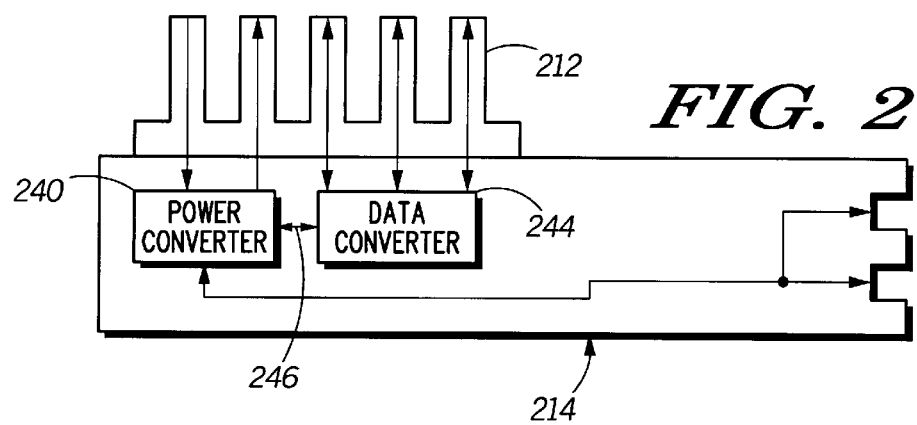
FIG. 2
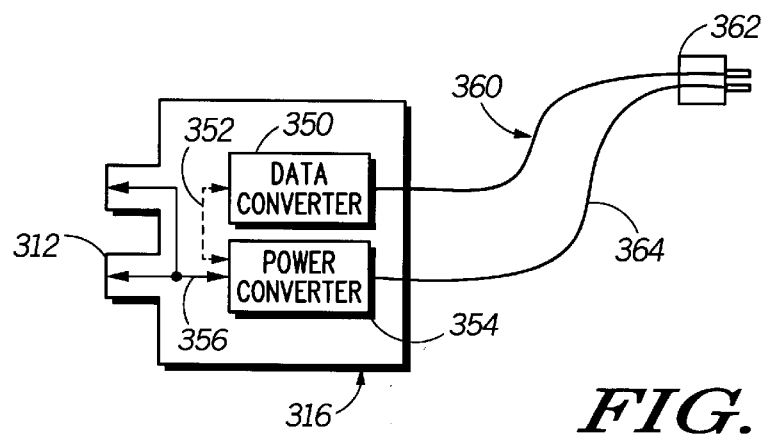
FIG. 3

MULTI-USE BATTERY

BACKGROUND OF THE INVENTION

1. Field of the Invention

The present invention relates to battery systems and, more specifically, to batteries used to power personal electronic devices.

2. Description of the Prior Art

Most common electronic devices, such as cell phones, personal data assistants and video recorders, have a battery that often runs out of power at a time when the user is unable to recharge the battery or when the user has no other compatible battery available. Often, when a critical electronic device runs out of power another device in the user's possession (e.g., a portable computer) will have plenty of charge available. However, it is currently impossible to connect a battery specifically made for a first type of electronic device to a second type of electronic device.

Therefore, there is a need for an apparatus that allows a user to connect a battery specifically made for a first type of electronic device to a second type of electronic device.

BRIEF DESCRIPTION OF THE FIGURES OF THE DRAWINGS

FIG. 1 is a schematic diagram of one embodiment of the invention.

FIG. 2 is a schematic diagram of a power adapter according to one embodiment of the invention.

FIG. 3 is a schematic diagram of a device-specific module and a delivery circuit according to one embodiment of the invention.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is an adapter 100 for interfacing a battery 102 for a portable computer to an electronic device (examples of such devices include a cellular telephone 130, a video camera 132, a personal data assistant 134, or one of many other types of electronic devices) of a type that is not normally compatible with the battery 102 for the portable computer. Typically a portable computer battery 102 is a "smart" battery that includes a plurality of cells 104 and a battery logic circuit 106 that provides battery monitoring and control functions. A contact bank 108 is coupled to the battery 102 to connect the battery 102 to a recharger (not shown), to the host device, or both. Because many computer batteries require receipt of certain control signals to transfer power, it may be necessary for the adapter 100 to emulate handshaking protocols required by the computer battery 102. The adapter 100 includes a power adapter 114 that is removably couplable to the portable computer battery 102 and one or more a device-specific modules 116, 118 and 120 that are removably couplable to the power adapter 114 by way of a compatible contact bank 112. The device-specific modules 116, 118 and 120 receive electrical current from the power adapter 114 and converts the voltage of the electrical current to a device-specific voltage of the device-specific type of voltage used by the electronic devices 130, 132 and 134.

As shown in FIG. 2, the power adapter 214 includes a power conversion circuit 240 that converts a first electrical voltage received from the battery to a second electrical voltage, which is typically of the type used by the electronic device. This circuit may be as simple as a transformer used to match DC voltages in some applications. The power adapter 214 also includes a data converter 244 that communicates with the battery logic circuit 106 and, thereby, emulates the control functions of the device normally connected to the battery. The data converter 244 may also control the power converter 240 via a control line 246. It will be understood that the shape of the contact bank 212 and the number of data lines from the data converter 244 could vary, depending upon the specific configuration of the battery.

As shown in FIG. 3, the device-specific module 316 includes a power input 356 that delivers power from the power adapter via a contact bank 312 to a power converter 354. The power converter 354 generates voltage specifically tailored for the electronic device and may be as simple as a transformer, or it may not even be necessary if the voltage output by the power adapter is identical to the voltage required by the electronic device. Also, the device specific module 316 might include a data converter 350 that performs emulation of any protocols required by the electronic device. The data converter 350 could also control power the functions of the power converter 354 via a control line 352. The device-specific module 316 delivers voltage to a delivery circuit 360 that couples the device-specific module 316 to the electronic device via a connector 362, which is complementary to the power jack of the electronic device, via a wire 364, thereby allowing delivery of device-specific electrical voltage to the electronic device.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An adapter for interfacing a battery for a portable computer to an electronic device of a type that is not normally compatible with the battery for the portable computer, comprising:

a. a power adapter that is removably couplable to a portable computer battery, the power adapter including a power conversion circuit that converts a first electrical voltage received from the battery to a second electrical voltage;

b. a device-specific module that is removably couplable to the power adapter that receives the second electrical voltage from the power adapter and that converts the second electrical voltage to a device-specific electrical voltage; and c. a delivery circuit that couples the device-specific module to the electronic device, thereby allowing delivery of the device-specific electrical voltage to the electronic device.

2. The adapter of claim 1, wherein the battery includes a first contact bank electrically coupled to at least one battery cell and coupled to at least one battery logic circuit and wherein the power adapter comprises:

a. a second contact bank that is complimentary to the first contact bank; and b. a power converter that converts the first electrical voltage from the battery cell to the second electrical voltage.

3. The adapter of claim 2, wherein the power adapter further comprises a first data converter, receptive to data from the battery logic circuit via the first contact bank and the second contact bank, that generates a first data signal that is compatible with a data protocol expected by the battery logic circuit and that communicates the first data signal to the battery logic circuit.

4. The adapter of claim 1, wherein the device-specific module comprises:
 a. a second contact bank that is complimentary to the first contact bank; and
 b. a power converter that converts the first electrical voltage from the battery cell to the second electrical voltage.

5. The adapter of claim 4, wherein the device-specific module further comprises a second data converter, receptive to data from the electronic device, that generates a second data signal that is compatible with a data protocol expected by the electronic device and that communicates the second data signal to the electronic device.

6. The adapter of claim 1, wherein the delivery circuit comprises a wire, electrically coupled to and extending from the device-specific module and terminating in a device-specific connector, the device-specific connector being complementary to a power jack of a preselected type of electronic device.

\* \* \* \* \*